United States Patent
Kim et al.

(10) Patent No.: US 8,336,097 B2
(45) Date of Patent: Dec. 18, 2012

(54) APPARATUS AND METHOD FOR MONITORING AND PROTECTING SYSTEM RESOURCES FROM WEB BROWSER

(75) Inventors: Su Yong Kim, Daejeon (KR); Dae Sik Choi, Daejeon (KR); Dong Hyun Lee, Daejeon (KR); Do Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 782 days.

(21) Appl. No.: 12/208,401

(22) Filed: Sep. 11, 2008

(65) Prior Publication Data

US 2009/0100517 A1    Apr. 16, 2009

(30) Foreign Application Priority Data

Oct. 12, 2007 (KR) .................. 10-2007-0103038
May 22, 2008 (KR) .................. 10-2008-0047443

(51) Int. Cl.
*G06F 11/00* (2006.01)
(52) U.S. Cl. .................................. 726/22; 713/165
(58) Field of Classification Search .......... 726/1, 22–26; 715/808, 747
See application file for complete search history.

(56) References Cited

U.S. PATENT DOCUMENTS

| | | | | |
|---|---|---|---|---|
| 5,944,824 A * | 8/1999 | He | | 726/6 |
| 5,974,566 A * | 10/1999 | Ault et al. | | 714/15 |
| 6,052,785 A * | 4/2000 | Lin et al. | | 726/5 |
| 6,076,108 A * | 6/2000 | Courts et al. | | 709/227 |
| 6,115,040 A * | 9/2000 | Bladow et al. | | 715/741 |
| 6,490,624 B1 * | 12/2002 | Sampson et al. | | 709/227 |
| 7,483,925 B2 * | 1/2009 | Koskimies et al. | | 1/1 |
| 7,765,592 B2 * | 7/2010 | Wang et al. | | 726/22 |
| 2005/0065935 A1 * | 3/2005 | Chebolu et al. | | 707/9 |
| 2005/0066290 A1 * | 3/2005 | Chebolu et al. | | 715/808 |
| 2005/0144482 A1 * | 6/2005 | Anuszewski | | 713/201 |
| 2006/0053383 A1 * | 3/2006 | Gauthier et al. | | 715/764 |
| 2006/0107256 A1 * | 5/2006 | Zarenin et al. | | 717/127 |
| 2007/0271220 A1 * | 11/2007 | Carter | | 707/2 |
| 2009/0013063 A1 * | 1/2009 | Soman | | 709/223 |
| 2009/0070878 A1 * | 3/2009 | Wang et al. | | 726/24 |

FOREIGN PATENT DOCUMENTS

| | | |
|---|---|---|
| KR | 1998-0070410 | 10/1998 |
| KR | 1020010092001 A | 10/2001 |
| KR | 1020020075601 A | 10/2002 |
| KR | 1020040056998 A | 7/2004 |
| KR | 1020060123024 A | 12/2006 |

OTHER PUBLICATIONS

Hwang-Bin Yim, et al; "An Extended Role-Based Access Control Model with Multi-level Security Control" Copyright © 2003 NuriMedia Co., Ltd. pp. 314-320.

* cited by examiner

*Primary Examiner* — Eleni Shiferaw
*Assistant Examiner* — Abu Sholeman
(74) *Attorney, Agent, or Firm* — Ladas & Parry LLP

(57) ABSTRACT

An apparatus and method for preventing an attempt to perform malicious activities using web browser weaknesses are provided. A file protection module monitors attempts to access at least one file resource when the web browser executes a program, and allows or denies access. A registry protection module monitors attempts to access at least one registry resource when the web browser executes a program, and allows or denies access. A process protection module monitors attempts to execute or terminate at least one process when the web browser executes a program, and allows or denies the execution or termination.

6 Claims, 5 Drawing Sheets

APPARATUS AND METHOD FOR MONITORING AND PROTECTING SYSTEM RESOURCES FROM WEB BROWSER

CROSS-REFERENCE TO RELATED APPLICATION

This application claims priority to and the benefit of Korean Patent Application No. 2007-103038, filed Oct. 12, 2007, and Korean Patent Application No. 2008-47443, filed May 22, 2008, the disclosure of which is incorporated herein by reference in its entirety.

BACKGROUND

1. Field of the Invention

The present invention relates to a web browser execution system and, more particularly, to an apparatus and method for monitoring and protecting system resources from a web browser by preventing malicious activities through the web browser.

2. Discussion of Related Art

In general, a web browser is software for enabling a user computer to access the Internet and read various information or web pages acquired from a web server, and includes plug-in programs operating in the web browser such as ActiveX Control.

Access to only system resources of a very limited region is basically allowed such that important system resources are not destroyed or exposed according to a web page creator's intentions when processing a web page in the web browser.

Here, the system resources accessed by the web browser are present in a computer device to be executed by the web browser and refer to files containing various types of information, registries, and the like.

On the other hand, some of various plug-in programs like ActiveX Control to be executed in the web browser are allowed to access system resources for web-page processing.

In particular, like other general application programs, ActiveX Control can access system resources without any limitations.

For this reason, attempts by malicious users to perform malicious activities using weaknesses of the plug-in program such as ActiveX Control or the web browser are rapidly increasing.

The weaknesses of the web browser including the plug-in program such as ActiveX Control are as follows.

First, there may be a problem concerning file write for newly generating a malicious file in the system or maliciously updating or deleting existing file content.

Second, there may be a problem concerning file read for unlawfully reading and leaking file content stored in the system.

Third, there may be a problem concerning registry write for newly generating a registry key and value in the system or maliciously changing or deleting a basic registry key and value.

Fourth, there may be a problem concerning registry read for unlawfully reading and leaking a registry key value stored in the system.

Fifth, there may be a problem concerning process execution for unlawfully executing a file stored in the system.

Sixth, there may be a problem concerning process termination for terminating an arbitrary ongoing process in the system.

SUMMARY OF THE INVENTION

The present invention provides an apparatus and method for preventing an attempt to perform malicious activities using web browser weaknesses.

According to an aspect of the present invention, there is provided an apparatus for monitoring and protecting system resources from a web browser, including: a file protection module that monitors attempts to access at least one file resource when the web browser executes a program, and allows or denies access; a registry protection module that monitors attempts to access at least one registry resource when the web browser executes a program, and allows or denies access; and a process protection module that monitors attempts to execute or terminate at least one process when the web browser executes a program, and allows or denies the execution or termination.

According to another aspect of the present invention, there is provided a method for monitoring and protecting system resources from a web browser, including: monitoring attempts to access at least one file resource when the web browser executes a program; determining, when the web browser attempts to access the at least one file resource, whether the at least one file resource is listed in one of a basically allowed/denied file resource list, a user's allowed/denied file resource list, and an always execute list; and allowing or denying the web browser access to the at least one file resource according to the determination.

According to still another aspect of the present invention, there is provided a method for monitoring and protecting system resources from a web browser, including: monitoring attempts to access at least one registry resource for program execution by the web browser; determining, when the web browser attempts to access the at least one registry resource, whether the at least one registry resource is listed in one of a basically allowed/denied registry resource list, a user's allowed/denied registry resource list, and an always execute list; and allowing or denying the web browser access to the at least one registry resource according to the determination.

According to yet another aspect of the present invention, there is provided a method for monitoring and protecting system resources from a web browser, including: monitoring attempts to execute or terminate at least one process for program execution by the web browser; determining, when the web browser attempts to execute or terminate the at least one process, whether the at least one process is listed in one of a basically allowed/denied process list, a user's allowed/denied process list, and an always execute list; and allowing or denying the web browser execution or termination of the at least one process according to the determination.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
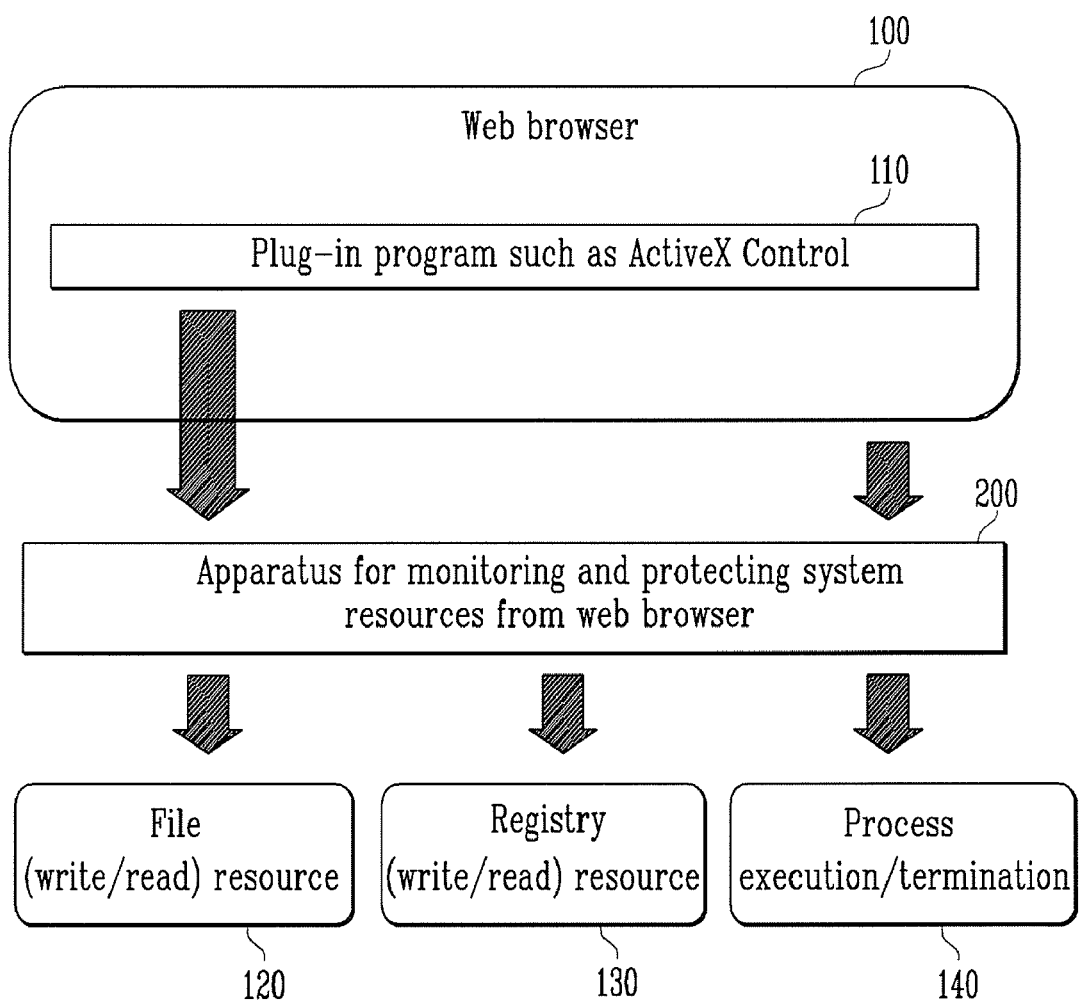
FIG. 1 shows a structure of a web browser system according to an exemplary embodiment of the present invention.

Exemplary embodiments of the present invention will be described in detail below with reference to the accompanying drawings. Throughout the drawings, the same or similar elements are consistently denoted by the same reference numerals. Descriptions of functions and constructions that are well-known by those of ordinary skill in the art are omitted for clarity and conciseness.

Hereinafter, a system for reading a web page through a web browser according to an exemplary embodiment of the present invention will be described with reference to FIG. 1.

FIG. 1 shows a structure of a web browser system according to an exemplary embodiment of the present invention.

Referring to FIG. 1, a web browser 100 includes a plug-in program such as ActiveX Control or the like and accesses at least one file resource 120 for performing a file write/read.

The web browser 100 accesses at least one file resource 120 for performing the file write/read and accesses at least one system resource for managing process execution/termination 140.

An apparatus 200 for monitoring and protecting system resources from the web browser monitors whether the web browser 100 accesses at least one system resource and performs a function for allowing or disallowing the web browser 100 to access at least one system resource.

The apparatus 200 monitors whether the web browser 100 executes or terminates at least one process and performs a function for allowing or disallowing the web browser 100 to execute or terminate the process.

Here, the apparatus 200 can operate inside or outside the web browser 100 and perform a function for monitoring whether the web browser 100 accesses system resources or allowing or disallowing the web browser 100 to access the system resources using conventional techniques such as an application programming interface (API) hooking technique and the like.

In the exemplary embodiment of the present invention, an example in which the apparatus 200 uses the API hooking technique has been described. Of course, any technique capable of intercepting an execution flow of a function called by the web browser 100 to access system resources is applicable within the technical scope of the present invention.

Figure 2:
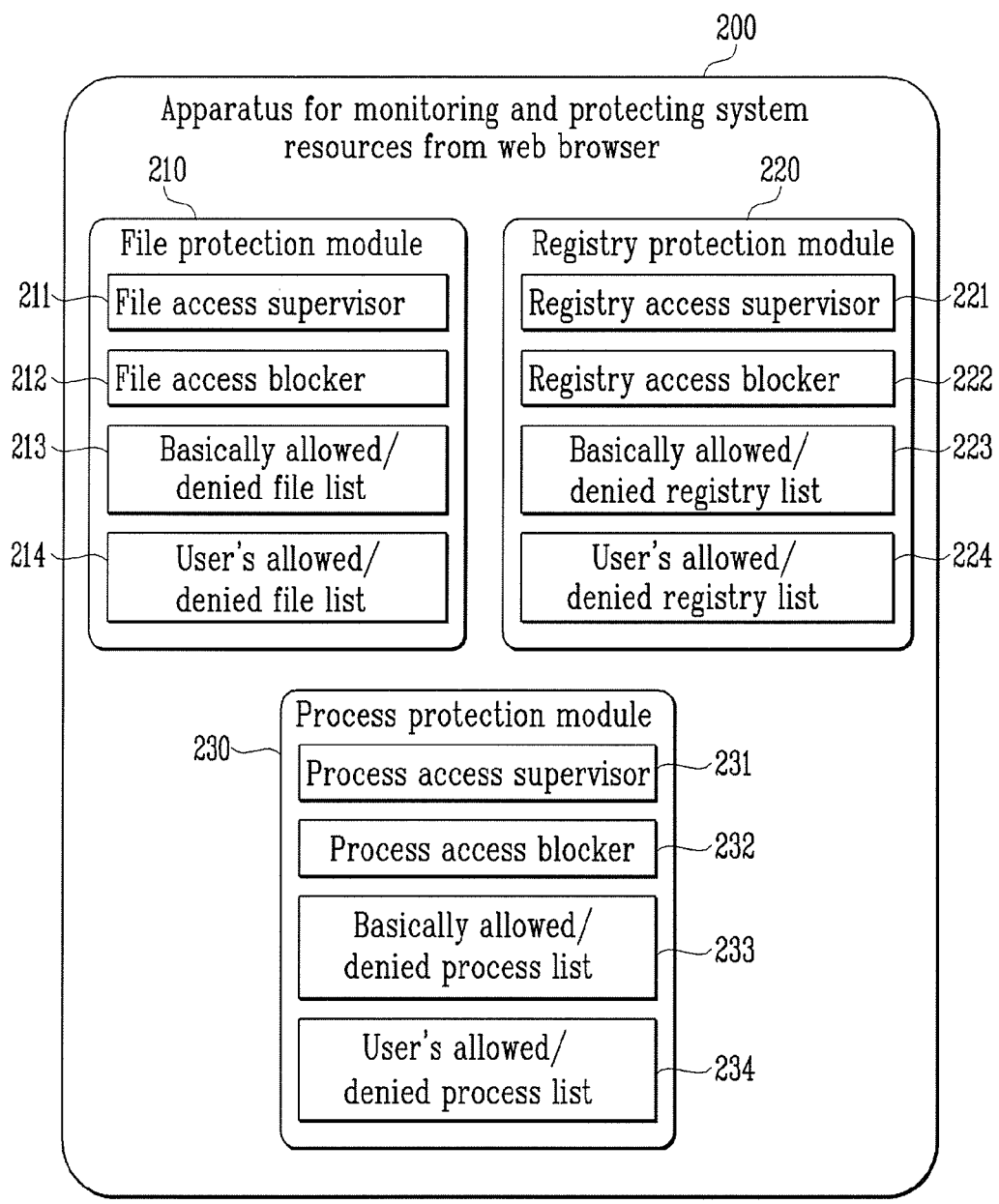
FIG. 2 shows an internal structure of an apparatus for monitoring and protecting system resources from a web browser according to an exemplary embodiment of the present invention.

FIG. 2 shows an internal structure of the apparatus for preventing malicious activities through the web browser according to an exemplary embodiment of the present invention.

Referring to FIG. 2, the apparatus 200 includes a file protection module 210 for managing access to the at least one file resource 120 such that the web browser 100 performs the file read/write, a registry protection module 220 for managing access to at least one registry resource 130 such that the web browser 100 performs the registry read/write, and a process protection module 230 for managing the process execution/termination 140 such that the web browser 100 executes/terminates at least one process.

The file protection module 210 includes a file access supervisor 211, a file access blocker 212, a basically allowed/denied file list 213, and a user's allowed/denied file list 214.

Here, the file access supervisor 211 acquires file resource information by intercepting functions called to access file resources from the web browser 100 and provides the acquired file resource information to the file access blocker 212.

When the file resource information is received from the file access supervisor 211, the file access blocker 212 determines whether the received file resource information is listed in one of the basically allowed/denied file list 213 and the user's allowed/denied file list 214.

When the corresponding file resource information is listed in either one of the basically allowed/denied file list 213 and the user's allowed/denied file list 214, the file access blocker 212 allows or disallows the web browser 100 to access the corresponding file resource information.

The basically allowed/denied file list 213 includes a basically allowed file list and a basically denied file list. The basically allowed file list includes files and folders of "Temporary Internet Files", "Favorites", "Cookies", and the like to which access is allowed in order for the web browser to operate normally.

The basically denied file list includes files and folders of "Start Program" and the like to which access by the web browser 100 is denied for security reasons.

The user's allowed/denied file list 214 includes the user's allowed file list and the user's denied file list and includes file and folder information explicitly or implicitly added by the user for allowing or denying access by the web browser 100.

The registry protection module 220 includes a registry access supervisor 221, a registry access blocker 222, a basically allowed/denied registry list 223, and the user's allowed/denied registry list 224.

The registry access supervisor 221 acquires registry information by intercepting functions called to access registry resources by the web browser 100, and provides the acquired registry resource information to the registry access blocker 222.

When the registry information is received from the registry access supervisor 221, the registry access blocker 222 determines whether the received registry information is listed in one of the basically allowed/denied registry list 223 and the user's allowed/denied registry list 224.

When the corresponding registry information is listed in either one of the basically allowed/denied registry list 223 and the user's allowed/denied registry list 224, the registry access blocker 222 allows or disallows the web browser 100 to access corresponding registry resources.

The basically allowed/denied registry list 223 includes a basically allowed registry list and a basically denied registry list. The basically allowed registry list includes registries to which access is allowed in order for the web browser to operate normally.

The basically denied registry list includes registries to which access by the web browser 100 is denied for security reasons. At this time, the registries included in the basically denied registry list can be "HKLM\SOFTWARE\Microsoft\Windows\Current Version\run", "HKLM\SOFTWARE\ Microsoft\Windows\Current Version\RunServices", "HKLM\ SOFTWARE\ Microsoft\Windows\Current Version\RunOnce", "HKCU\ SOFTWARE\Microsoft\ Windows\Current Version\Run", and "HKCU\SOFTWARE\ Microsoft\Windows\Current Version\Runonce".

The user's allowed/denied registry list 224 includes the user's allowed registry list and the user's denied registry list and includes registry information explicitly or implicitly added by the user for allowing or denying access by the web browser 100.

The process protection module 230 includes a process access supervisor 231, a process access blocker 232, a basically allowed/denied process list 233, and the user's allowed/denied process list 234.

The process access supervisor 231 acquires process information by intercepting functions called for process execution by the web browser 100 and provides the acquired process information to the process access blocker 232.

When the process information is received from the process access supervisor 231, the process access blocker 232 determines whether the received process information is listed in one of the basically allowed/denied process list 233 and the user's allowed/denied process list 234.

When the corresponding process information is listed in either one of the basically allowed/denied process list 233 and the user's allowed/denied process list 234, the process access blocker 232 allows or disallows the web browser 100 to execute or terminate a corresponding process.

The basically allowed/denied process list 233 includes a basically allowed process list and a basically denied process list. The basically allowed process list includes processes to which access is allowed in order for the web browser to operate normally.

Here, the processes listed in the basically allowed process list include a process of "notpad.exe" and the like to be executed when the user views a source of the web browser 100 and the like.

The basically denied process list includes processes to which access by the web browser 100 is denied for security reasons.

Here, the basically denied process list is frequently used to prevent malicious activities and includes "cmd.exe", "mshta.exe", and the like, which are not substantially needed for normal use of the web browser 100.

The user's allowed/denied process list 234 includes the user's allowed process list and the user's denied process list and includes process information explicitly or implicitly added by the user for allowing or denying access by the web browser 100.

Next, a method for preventing malicious activities using the apparatus for monitoring and protecting system resources from the web browser according to an exemplary embodiment of the present invention will be described in detail with reference to FIGS. 3 to 7.

Figure 3:
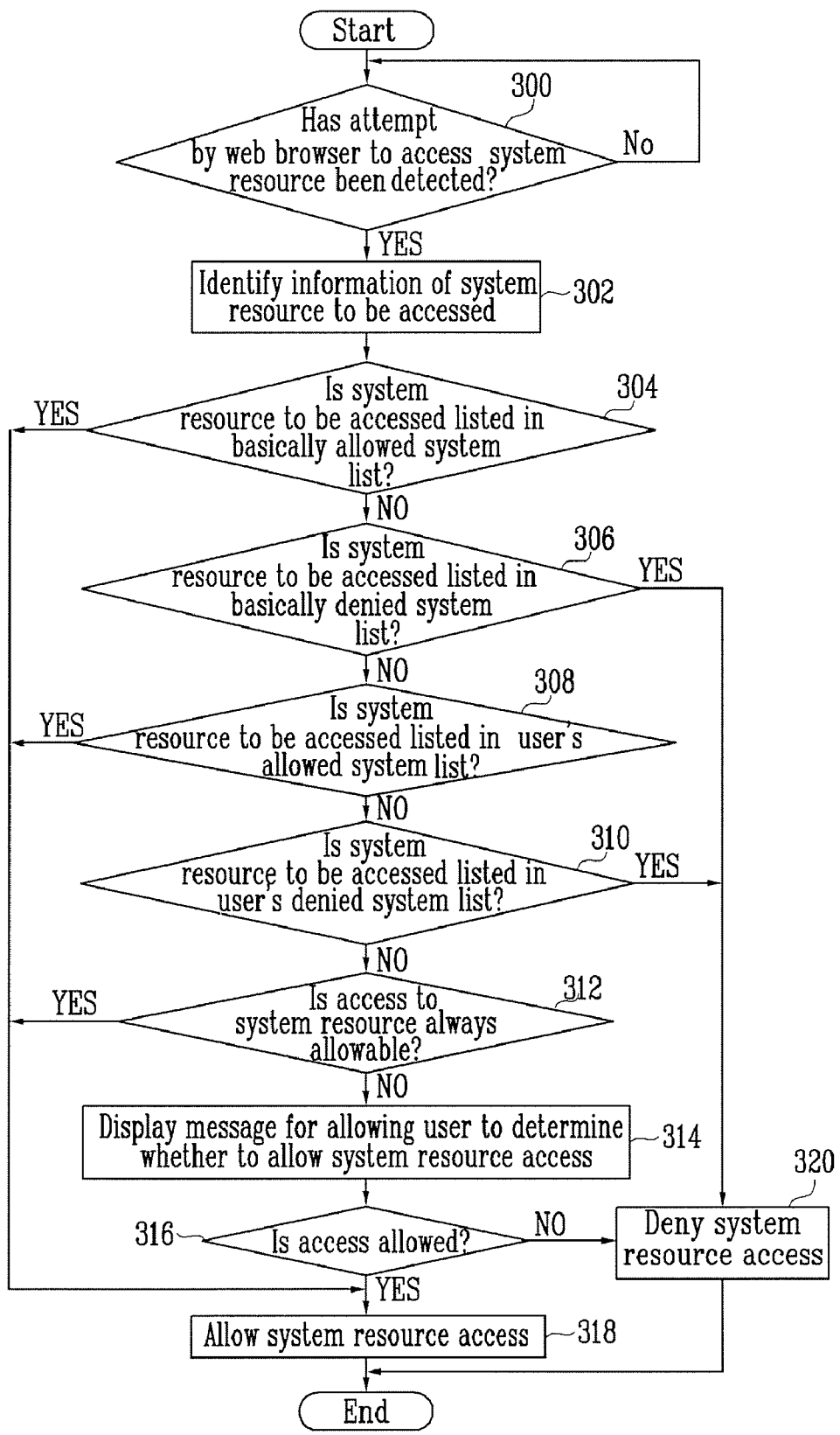
FIG. 3 is a flowchart showing a control process for preventing malicious activities performed by the apparatus for monitoring and protecting system resources from a web browser according to an exemplary embodiment of the present invention.

FIG. 3 is a flowchart showing a control process for preventing malicious activities performed by the apparatus for monitoring and protecting system resources from the web browser according to an exemplary embodiment of the present invention.

Figure 4:
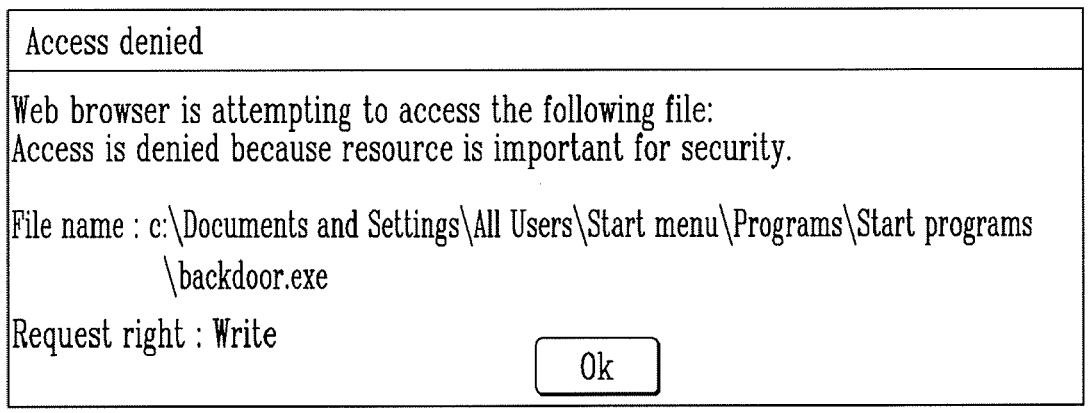
FIG. 4 shows an example of a screen for web browser file resource access according to an exemplary embodiment of the present invention.

FIG. 4 shows an example of a screen for web browser file resource access according to an exemplary embodiment of the present invention.

Figure 5:
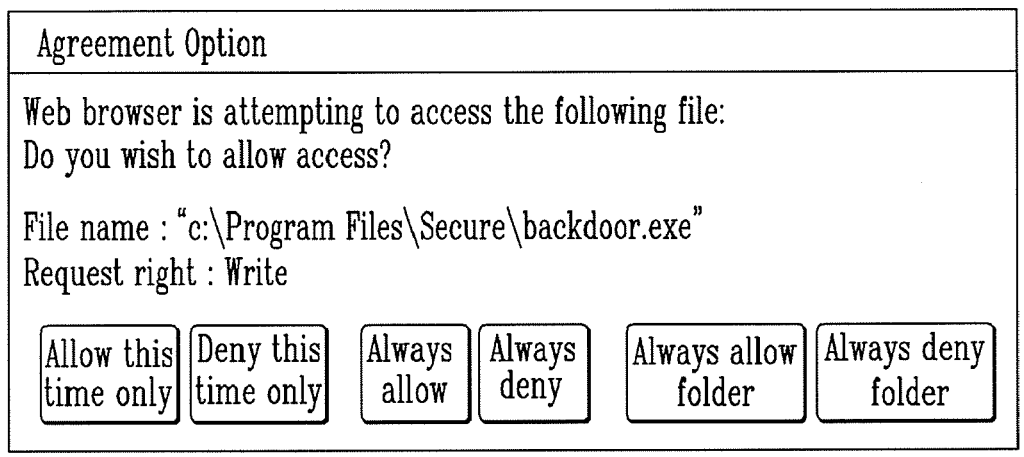
FIG. 5 shows an example of a screen for requesting user agreement for web browser file resource access according to an exemplary embodiment of the present invention.

FIG. 5 shows an example of a screen for requesting user agreement for web browser file resource access according to an exemplary embodiment of the present invention.

Figure 6:
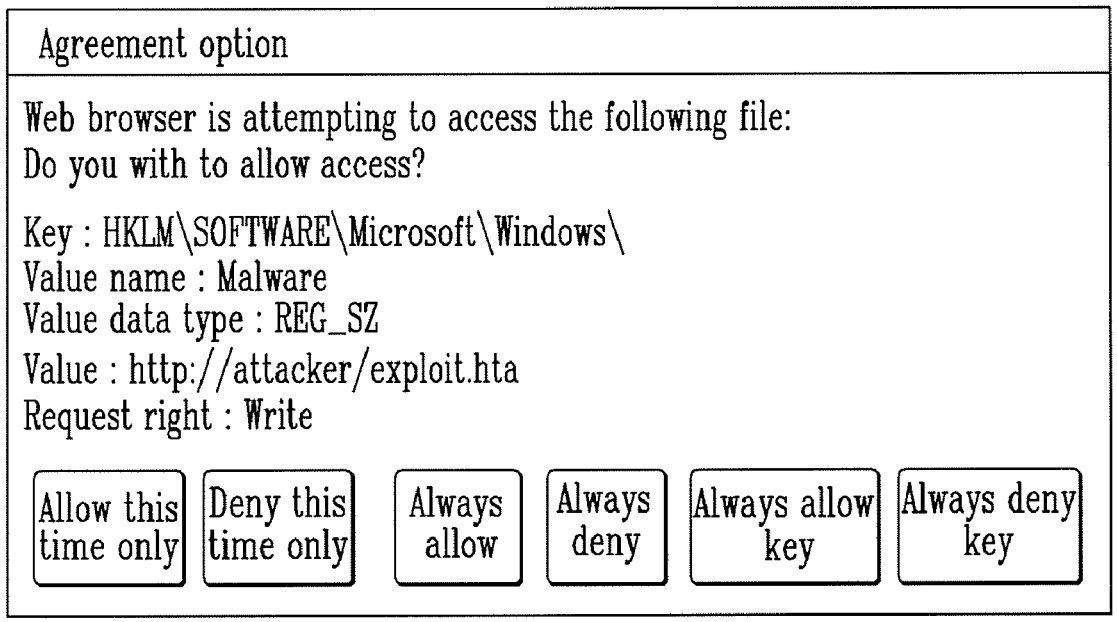
FIG. 6 shows an example of a screen for requesting user agreement for web browser registry resource access according to an exemplary embodiment of the present invention.

FIG. 6 shows an example of a screen for requesting user agreement for web browser registry resource access according to an exemplary embodiment of the present invention.

Figure 7:
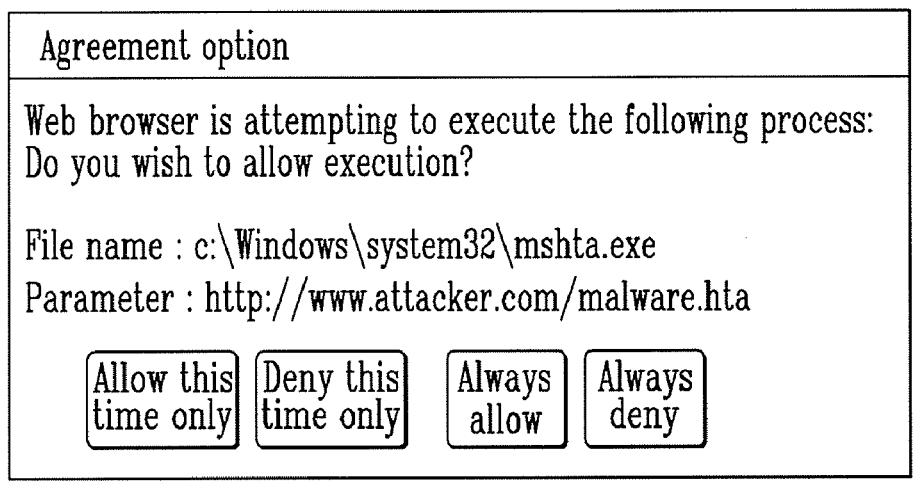
FIG. 7 shows an example of a screen for requesting user agreement for web browser process execution according to an exemplary embodiment of the present invention.

FIG. 7 shows an example of a screen for requesting user agreement for web browser process execution according to an exemplary embodiment of the present invention.

Referring to FIGS. 3 to 7, when the web browser 100 attempts to access a system resource in order to process a web page upon visiting the web page, the apparatus 200 detects the access attempt in step 300 and goes to step 302.

In step 302, the apparatus 200 identifies information of the system resource that the web browser 100 is attempting to access.

Here, the system resource can be one of the file resource 120, the registry resource 130, and the process execution/termination 140.

When identifying the system resource that the web browser 100 is attempting to access in step 302, the apparatus 200 determines whether the system resource is listed in a basically allowed system list in step 304.

Here, the basically allowed system list can be one of the basically allowed file list 213, the basically allowed registry list 223, and the basically allowed process list 233. When the system resource that the web browser 100 is attempting to access is the file resource 120 in step 302, the basically allowed system list can be the basically allowed file list 213. In the case of the registry resource 130, the basically allowed system list can be the basically allowed registry list 223. When process execution/termination is detected, the basically allowed system list can be the basically allowed process list 233.

Upon determining that the system resource that the web browser 100 is attempting to access is listed in the basically allowed system list in step 304, the apparatus 200 goes to step 318.

In step 318, the apparatus 200 allows the web browser 100 to access the corresponding system resource.

Upon determining that the system resource that the web browser 100 is attempting to access is not listed in the basically allowed system list in step 304, the apparatus 200 goes to step 306.

In step 306, the apparatus 200 determines whether the system resource that the web browser 100 is attempting to access is listed in a basically denied system list.

Here, the basically denied system list can be one of the basically denied file list 213, the basically denied registry list 223, and the basically denied process list 233. When the system resource that the web browser 100 is attempting to access is the file resource 120, the basically denied system list can be the basically denied file list 213. In the case of the registry resource 130, the basically denied system list can be the basically denied registry list 223. When the process execution/termination is detected, the basically denied system list can be the basically denied process list 233.

Upon determining that the system resource that the web browser 100 is attempting to access is listed in the basically denied system list in step 306, the apparatus 200 goes to step 320.

In step 320, the apparatus 200 disallows the web browser to access the corresponding system resource and notifies the user that access by the web browser 100 to the corresponding system resource is denied by displaying an access denied message, as shown in FIG. 4.

Upon determining that the system resource that the web browser 100 is attempting to access is not listed in the basically denied system list in step 306, the apparatus 200 goes to step 308.

In step 308, the apparatus 200 determines whether the system resource that the web browser 100 is attempting to access is listed in the user's allowed system list.

Here, the user's allowed system list can be one of the user's allowed file list 214, the user's allowed registry list 224, and the user's allowed process list 234. When the system resource that the web browser 100 is attempting to access is the file resource 120, the user's allowed system list can be the user's allowed file list 214. In the case of the registry resource 130, the user's allowed system list can be the user's allowed registry list 224. When the process execution/termination is detected, the user's allowed system list can be the user's allowed process list 234.

Upon determining that the system resource that the web browser 100 is attempting to access is listed in the user's allowed system list in step 308, the apparatus 200 goes to step 318 to allow the web browser to access a corresponding system resource.

Upon determining that the system resource that the web browser 100 is attempting to access is not listed in the user's allowed system list in step 308, the apparatus 200 goes to step 310.

In step 310, the apparatus 200 determines whether the system resource that the web browser 100 is attempting to access is listed in the user's denied system list.

Here, the user's denied system list can be one of the user's denied file list 214, the user's denied registry list 224, and the user's denied process list 234. When the system resource that the web browser 100 is attempting to access is the file resource 120, the user's denied system list can be the user's denied file list 214. In the case of the registry resource 130, the user's denied system list can be the basically denied registry list 224. When process execution/termination is detected, the user's denied system list can be the user's denied process list 234.

Upon determining that the system resource that the web browser 100 is attempting to access is listed in the user's denied system list in step 310, the apparatus 200 goes to step 320 to deny the web browser access to the corresponding system resource.

Upon determining that the system resource that the web browser 100 is attempting to access is not listed in the user's denied system list in step 310, the apparatus 200 goes to step 312 to determine whether access to the corresponding system resource by the web browser 100 is always allowed.

Upon determining that access to the corresponding system resource by the web browser 100 is always allowed in step 312, the apparatus 200 goes to step 318 to allow the web browser 100 to access the corresponding system resource.

Upon determining that access to the corresponding system resource by the web browser 100 is not always allowed in step 312, the apparatus 200 goes to step 314 to display a message for specifying whether the web browser 100 is allowed to access the system resource, as shown in FIG. 5, 6, or 7.

First, when the system resource is the file resource 120, the apparatus 200 displays a message for specifying whether the web browser 100 is allowed to access the system resource, as shown in FIG. 4 in step 314.

Then, the user selects one of "Allow this time only", "Deny this time only", "Always allow", "Always deny", "Always allow folder", and "Always deny folder", as shown in FIG. 4.

Here, when the user selects "Always allow" or "Always allow folder", the apparatus 200 determines it in step 316 and goes to step 318 to allow the web browser 100 to access the file resource 120.

Then, the apparatus 200 adds a file or folder of the file resource 120 that the web browser 100 is attempting to access to the user's allowed file list 214 and automatically allows the web browser 100 to access the corresponding file resource 120.

However, upon determining that the user has selected "Always deny" or "Always deny folder" in step 316, the apparatus 200 goes to step 320 to disallow the web browser 100 to access the file resource 120 and add a file or folder of the file resource 120 that the web browser 100 is attempting to access to the user's denied file list 214. Thereafter, when the web browser 100 attempts to access the corresponding file resource 120, access is automatically denied.

Upon determining that the user has selected "Allow this time only" in step 316, the apparatus 200 goes to step 318 to allow the web browser 100 to access the file resource 120.

Upon determining that the user has selected "Deny this time only" in step 316, the apparatus 200 goes to step 320 to disallow the web browser 100 to access the file resource 120.

On the other hand, when the system resource is the registry resource 130, the apparatus 200 displays a message for identifying whether the web browser 100 is allowed to access the registry resource, as shown in FIG. 6, in step 314.

Then, the user selects one of "Allow this time only", "Deny this time only", "Always allow", "Always deny", "Always allow key", and "Always deny key", as shown in FIG. 6.

At this time, when the user selects "Always allow" or "Always allow key", the apparatus 200 determines it in step 316 and goes to step 318 to allow the web browser 100 to access the registry resource 130.

Then, the apparatus 200 adds the registry resource 130 or the registry key of the registry value that the web browser 100 is attempting to access to the user's allowed registry list 224.

Thereafter, when the web browser 100 re-attempts to access the corresponding registry resource 130, the apparatus 200 automatically allows the web browser 100 to have access. Access to all lower registry keys and values within the added registry key is also automatically allowed.

However, upon determining that the user has selected "Always deny" or "Always deny key" in step 316, the apparatus 200 goes to step 320 to disallow the web browser 100 to access the registry resource 130.

Then, the apparatus 200 adds the registry resource or the registry key of the registry value that the web browser 100 is attempting to access to the user's denied registry list 224.

Thereafter, when the web browser 100 re-attempts to access the corresponding registry resource 130, the apparatus 200 automatically disallows the web browser 100 to have access. Access to all lower registry keys and values within the added registry key is also automatically denied.

Upon determining that the user has selected "Allow this time only" in step 316, the apparatus 200 goes to step 318 to allow the web browser 100 to access the registry resource 130.

Upon determining that the user has selected "Deny this time only" in step 316, the apparatus 200 goes to step 320 to disallow the web browser 100 to access the registry resource 130.

On the other hand, upon determining that the web browser 100 has attempted the process execution/termination 140 in step 314, the apparatus 200 displays a message for identifying whether a process is allowed, as shown in FIG. 7.

The user selects one of "Allow this time only", "Deny this time only", "Always allow", and "Always deny", shown in FIG. 7.

At this time, when the user selects "Always allow", the apparatus 200 determines it in step 316 and goes to step 318 to allow the process execution/termination 140 of the web browser 100.

The apparatus 200 adds a process that the web browser 100 has attempted to execute/terminate to the user's allowed process list 234. Thereafter, the attempt by the web browser 100 for the corresponding process execution/termination 140 is automatically allowed.

However, upon determining that the user has selected "Always deny" in step 316, the apparatus 200 goes to step 320 to deny the process execution/termination 140 of the web browser 100, and adds a process that the web browser 100 has attempted to execute/terminate to the user's denied process list 234.

When the web browser 100 re-attempts the corresponding process execution/termination 140, the apparatus 200 automatically denies the process execution/termination 140 of the web browser 100.

On the other hand, upon determining that the user has selected "Allow this time only" in step 316, the apparatus 200 goes to step 318 to allow the process execution/termination 140 of the web browser 100.

However, upon determining that the user has selected "Deny this time only" in step 316, the apparatus 200 goes to step 320 to deny the process execution/termination 140 of the web browser 100.

As described above, the apparatus 200 for monitoring and protecting system resources from a web browser according to exemplary embodiments of the present invention monitors attempts by the web browser 100 to access system resources and allows or denies access to the system resources according to a preset process.

According to exemplary embodiments of the present invention, access to system resources by the web browser 100 is allowed or denied as desired by a user.

The present invention can prevent malicious activities through a web browser and safely operate a web browser system by monitoring web browser access to system resources and allowing web browser access to only predefined or user-allowed system resources.

The present invention can prevent malicious activities using weaknesses of the web browser by monitoring and protecting system resources from the web browser.

Although exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. An apparatus for monitoring and protecting system resources stored in a computer system from a web browser while the web browser is executing a plug-in program in the computer system, comprising:
   a file protection module that monitors attempts to access at least one file resource when the web browser executes the plug-in program, and allows or denies access to the file resource by first determining whether the file resource is listed in a basically allowed file list of resources to which access is basically allowed to operate the web browser; if the file resource is not listed in the basically allowed file list, determining whether the file resource is listed in a basically denied file list of resources to which access is basically denied to operate the web browser; if the file resource is not listed in the basically denied file list, determining whether the file resource is listed in a user's allowed file list of resources to which file resource access by the web browser is allowed by setting of the user; if the file resource is not listed in the user's allowed file list, determining whether the file resource is listed in a user's denied file list of resources to which file resource access by the web browser is denied by setting of the user;
   a registry protection module that monitors attempts to access at least one registry resource when the web browser executes the plug-in program, and allows or denies access to the registry resource by first determining whether the registry resource is listed in a basically allowed registry list of resources to which access is basically allowed to operate the web browser; if the file resource is not listed in the basically allowed registry list, determining whether the registry resource is listed in a basically denied registry list of resources to which access is basically denied to operate the web browser; if the registry resource is not listed in the basically denied registry list, determining whether the registry resource is listed in a user's allowed registry list of resources to which access by the web browser is allowed by setting of the user; if the registry resource is not listed in the user's allowed registry list, determining whether the registry resource is listed in a user's denied registry list of resources to which access by the web browser is denied by setting of the user; and
   a process protection module that monitors attempts to execute or terminate at least one process when the web browser executes the plug-in program, and allows or denies the execution or termination of the process by first determining whether the process execution or termination is listed in a basically allowed process list of processes for which process execution or termination is basically allowed to operate the web browser; if the process execution or termination is not listed in the basically allowed process list, determining whether the process execution or termination is listed in a basically denied process list of processes for which process execution or termination is basically denied to operate the web browser; if the process execution or termination is not listed in the basically denied process list, determining whether the process execution or termination is listed in a user's allowed process list of processes for which process execution or termination by the web browser is allowed by setting of the user; if the process execution or termination is not listed in the user's allowed process list, determining whether the process execution or termination is listed in a user's denied process list of processes for which process execution or termination by the web browser is denied by setting of the user.

2. The apparatus of claim 1, wherein the file protection module comprises:
   a file access supervisor that monitors attempts by the web browser to access at least one file resource and sends information of the at least one file resource to which access has been attempted to a file access blocker; and
   the file access blocker that determines whether to allow the web browser to access the at least one file resource of the information received from the file access supervisor on the basis of the basically allowed/denied file list and the user's allowed/denied file list, and allows or denies access by the web browser.

3. The apparatus of claim 1, wherein the registry protection module comprises:
   a registry access supervisor that monitors attempts by the web browser to access at least one registry resource and sends information of the at least one registry resource to which access has been attempted to a registry access blocker; and the registry access blocker that determines whether to allow the web browser to access the at least one registry resource of the information received from the registry access supervisor on the basis of the basically allowed/denied registry list and the user's allowed/denied registry list, and allows or denies access by the web browser.

4. The apparatus of claim 1, wherein the process protection module comprises:

a process access supervisor that monitors attempts by the web browser to execute or terminate at least one process and sends information of the at least one process for which the process execution or termination by the web browser has been attempted to a process access blocker; and the process access blocker that determines whether to allow the web browser to execute or terminate the at least one process of the information received from the process access supervisor on the basis of the basically allowed/denied process list and the user's allowed/denied process list and allows or denies the process execution or termination by the web browser.

5. A method for monitoring and protecting system resources stored in a computer system from a web browser while the web browser is executing a plug-in program in the computer system, comprising:

monitoring attempts to access at least one file resource when the web browser executes the plug-in program and when the web browser attempts to access the at least one file resource, allowing or denying the access to the file resource by first determining whether the file resource is listed in a basically allowed file list of resources to which access is basically allowed to operate the web browser; if the file resource is not listed in the basically allowed file list, determining whether the file resource is listed in a basically denied file list of resources to which access is basically denied to operate the web browser; if the file resource is not listed in the basically denied file list, determining whether the file resource is listed in a user's allowed file list of resources to which file resource access by the web browser is allowed by setting of the user; if the file resource is not listed in the user's allowed file list, determining whether the file resource is listed in a user's denied file list of resources to which file resource access by the web browser is denied by setting of the user;

monitoring attempts to access at least one registry resource when the web browser executes the plug-in program and, when the web browser attempts to access the at least one registry resource, allowing or denying the web browser access to the at least one registry resource by first determining whether the registry resource is listed in a basically allowed registry list of resources to which access is basically allowed to operate the web browser; if the file resource is not listed in the basically allowed registry list, determining whether the registry resource is listed in a basically denied registry list of resources to which access is basically denied to operate the web browser; if the registry resource is not listed in the basically denied registry list, determining whether the registry resource is listed in a user's allowed registry list of resources to which access by the web browser is allowed by setting of the user; if the registry resource is not listed in the user's allowed registry list, determining whether the registry resource is listed in a user's denied registry list of resources to which access by the web browser is denied by setting of the user; and monitoring attempts to execute or terminate at least one process when the web browser executes the plug-in program and, when the web browser attempts to execute or terminate the at least one process, allowing or denying the execution or termination of the process by first determining whether the process execution or termination is listed in a basically allowed process list of processes for which process execution or termination is basically allowed to operate the web browser; if the process execution or termination is not listed in the basically allowed process list, determining whether the process execution or termination is listed in a basically denied process list of processes for which process execution or termination is basically denied to operate the web browser; if the process execution or termination is not listed in the basically denied process list, determining whether the process execution or termination is listed in a user's allowed process list of processes for which process execution or termination by the web browser is allowed by setting of the user; if the process execution or termination is not listed in the user's allowed process list, determining whether the process execution or termination is listed in a user's denied process list of processes for which process execution or termination by the web browser is denied by setting of the user.

6. The apparatus of claim 1, wherein the basically allowed list comprises files and folders of "Temporary Internet Files," "Favorites," "Cookies," and the like to which access is allowed in order for the web browser to operate normally, and the basically denied file list comprises files and folders of "Start Program" and the like to which access by the web browser is denied for security reasons.

* * * * *